United States Patent
Chen

(10) Patent No.: US 9,056,373 B2
(45) Date of Patent: Jun. 16, 2015

(54) MANUFACTURING PROCESS FOR A CHAIN TOOL ATTACHED TO A BICYCLE FOLDING TOOL

(71) Applicant: Tuo-Jen Chen, Taichung (TW)

(72) Inventor: Tuo-Jen Chen, Taichung (TW)

(73) Assignee: WINRIDE INTERNATIONAL CO., LTD., Taichung (TW)

( * ) Notice: Subject to any disclaimer, the term of this patent is extended or adjusted under 35 U.S.C. 154(b) by 338 days.

(21) Appl. No.: 13/732,426

(22) Filed: Jan. 1, 2013

(65) Prior Publication Data

US 2014/0182418 A1 Jul. 3, 2014

(51) Int. Cl.
*B21D 28/00* (2006.01)
*B23P 15/00* (2006.01)
*B25B 27/00* (2006.01)
*B25B 27/22* (2006.01)
*B25F 1/04* (2006.01)

(52) U.S. Cl.
CPC ............. *B23P 15/00* (2013.01); *B25B 27/0071* (2013.01); *B25B 27/22* (2013.01); *B25F 1/04* (2013.01)

(58) Field of Classification Search
CPC ..... B23P 15/00; B25B 27/0071; B25B 27/22; B25F 1/04
USPC .......................................... 76/101.1, 117, 119
See application file for complete search history.

(56) References Cited

U.S. PATENT DOCUMENTS

| | | | | |
|---|---|---|---|---|
| 1,584,898 A | * | 5/1926 | Smith | 408/227 |
| 1,773,471 A | * | 8/1930 | Berg | 72/341 |
| 1,844,241 A | * | 2/1932 | Bryant | 81/441 |
| 2,127,574 A | * | 8/1938 | Slotta | 76/117 |
| 2,388,022 A | * | 10/1945 | Tucker et al. | 408/207 |
| 2,826,893 A | * | 3/1958 | Falk et al. | 59/7 |
| 4,103,378 A | * | 8/1978 | Granados | 7/138 |
| 4,147,088 A | * | 4/1979 | Whittaker, Jr. | 411/387.8 |
| 5,140,736 A | * | 8/1992 | Hsiao | 29/243.54 |
| 5,148,590 A | * | 9/1992 | Wu | 29/257 |
| 6,574,817 B2 | * | 6/2003 | Wu | 7/138 |
| 6,748,637 B2 | * | 6/2004 | Meggiolan | 29/257 |
| 6,988,288 B2 | * | 1/2006 | Wang | 7/138 |
| 7,254,935 B1 | * | 8/2007 | Huang | 59/7 |
| 7,299,514 B2 | * | 11/2007 | Wu | 7/138 |
| 8,136,338 B2 | * | 3/2012 | Huang | 59/7 |
| 8,141,333 B2 | * | 3/2012 | Yu | 59/7 |
| 8,166,745 B2 | * | 5/2012 | Seiter et al. | 59/7 |
| 8,256,083 B2 | * | 9/2012 | Huang | 29/270 |
| 2014/0182418 A1 | * | 7/2014 | Chen | 76/117 |

FOREIGN PATENT DOCUMENTS

DE 10 2012 113 088 A1 * 6/2014
DE 10 2013 100 027 A1 * 7/2014

* cited by examiner

*Primary Examiner* — Hwei C Payer

(57) ABSTRACT

A manufacturing process for a chain tool attached to a bicycle folding tool included the following steps: Material preparing step: a rod with a length is prepared. Manufacturing step: the rod is milled via a milling cutting step to form a chain fixing groove, a detaching portion, an axial groove and a screwing portion, the chain fixing groove having a retaining wall, the retaining wall being milled to form an arc notch, the screwing portion being threaded to form a threaded hole via a drilling and tapping step. Heat treatment step: after the manufacturing process, the rod is heat treated. Sheet metal part assembling step: a sheet metal part is assembled to the chain tool by at least one connecting part; therefore, the chain tool is attachable to the sheet metal part.

4 Claims, 10 Drawing Sheets

MANUFACTURING PROCESS FOR A CHAIN TOOL ATTACHED TO A BICYCLE FOLDING TOOL

BACKGROUND OF THE INVENTION

1. Field of the Invention

The present invention relates to a manufacturing process, and more particularly to a manufacturing process for a chain tool attached to a bicycle folding tool.

2. Description of Related Art

A conventional chain tool of a bicycle folding tool comprises a chain tool attached to a folding tool. The chain tool is made by casting process. The chain tool is further manufactured to form an additional functional structure by a mechanical process so as to add the additional function for the chain tool. The conventional casting process comprises following steps: wax injection, wax combine, fluid dipping, stucco, dewaxing, sintering, pouring, shell removing, cutting, gate grinding, sand blasting and surface finishing. However, the conventional chain tool of a bicycle folding tool which is made by casting method has some disadvantages as following.

1. The conventional casting process has numerous steps, so that the conventional casting process is time-consuming and inconvenient to modify the design and size of the chain tool if necessary.

2. The conventional casting process is hard to control the quality and the dimensional precision of the object.

3. The conventional chain tool made by casting process needs additional manufacturing for finishing.

Another conventional chain tool of a bicycle folding tool comprises a chain tool, wherein the chain tool and a folding tool are formed integrally so that the appearance and the size of the folding tool are restricted; besides, the folding tool only has one side to assemble other tools. Therefore, the conventional chain tool of a bicycle folding tool is inconvenient to manufacture.

The present invention has arisen to mitigate and/or obviate the disadvantages of the conventional manufacturing process for a chain tool.

SUMMARY OF THE INVENTION

The main objective of the present invention is to provide a manufacturing process for a chain tool.

To achieve the objective, a manufacturing process for a chain tool attached to a bicycle folding tool comprises following steps: (a) Material preparing step: a rod with a length being prepared; (b) Manufacturing step: the manufacturing step comprising a milling cutting step and a drilling and tapping step, the rod being milled via the milling cutting step to form a chain fixing groove, a detaching portion, an axial groove and a screwing portion, the chain fixing groove having a retaining wall defined therein, the retaining wall being milled to form an arc notch, the axial groove being defined in one end of the rod and communicating with the chain fixing groove, the screwing portion being threaded to form a threaded hole via the drilling and tapping step, wherein the axial groove, the arc notch and the threaded hole are defined coaxially; (c) Heat treatment step: after the manufacturing process, the rod being heat treated and forming a chain tool; (d) Sheet metal parts assembling step: choosing a sheet metal part, and then the sheet metal part assembled to the chain tool by at least one connecting part so that the chain tool is attachable to various sheet metal parts. Wherein, the milling cutting step and the drilling and tapping step of the manufacturing step could be interchanged under the manufacturing step; the sheet metal part has a first assembling portion and a first working portion; the first assembling portion of the sheet metal part is assembled to the chain tool; the first working portion has a plurality of clamping grooves defined on an outer periphery thereof so as to adjust the tension of spokes; the sheet metal part comprises a pressing rod and a controlling member; the pressing rod has a bending end, an operating end and a threaded section which is defined between the bending end and the operating end; the controlling member has a second assembling portion, a plurality of clamping grooves and an second operating part; the second assembling portion of the controlling member is assembled to the bending end of the pressing rod; wherein, the operating end of the pressing rod is inserted into the threaded hole firstly; and then, the threaded section is screwed into the threaded hole; the controlling member is located outside the chain tool, so that the user rotates the pressing rod conveniently, such that the threaded section of the pressing rod is rotated relative to the threaded hole; the bending end of the pressing rod is cylindrical bending-shaped or bending-shaped with a rectangular cross-section; the at least one connecting part is screw or rivet; the rod is square-shaped or circle-shaped or hexagonal-shaped.

Further benefits and advantages of the present invention will become apparent after a careful reading of the detailed description with appropriate reference to the accompanying drawings.

DETAILED DESCRIPTION OF THE INVENTION

Figure 1:
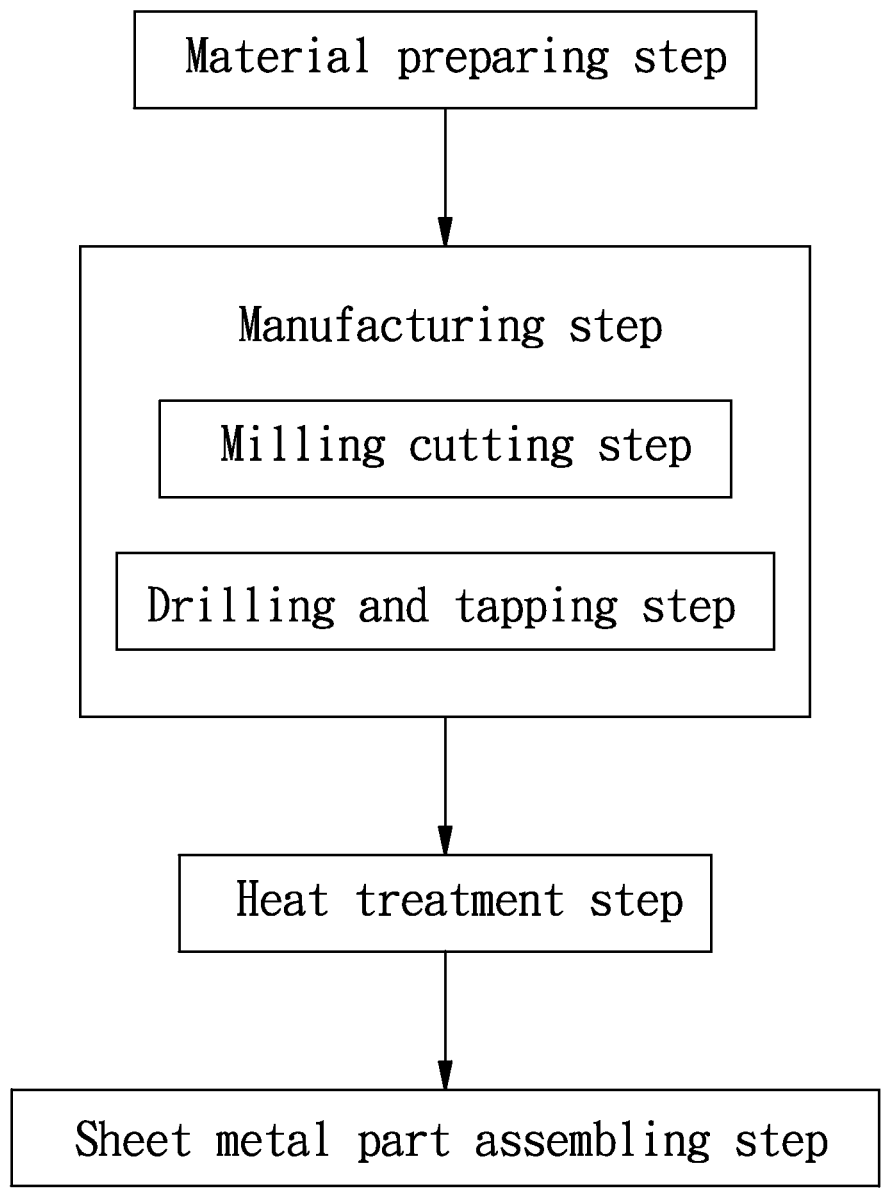
FIG. 1 is a flow chart of a manufacturing process for a chain tool of a bicycle folding tool of the present invention.
Figure 2:
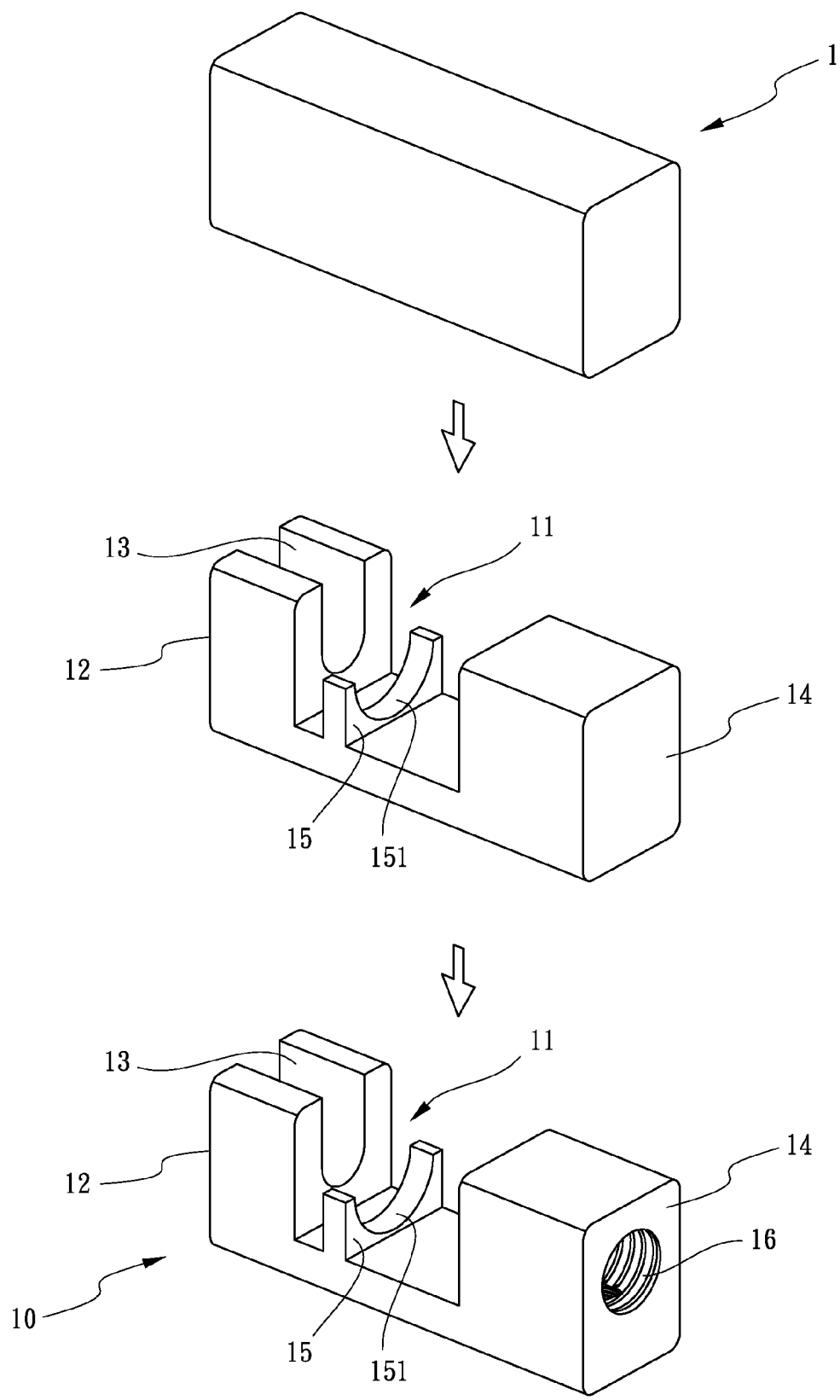
FIG. 2 is a machining sketch chart of the present invention for showing the manufacturing process.
Figure 3:
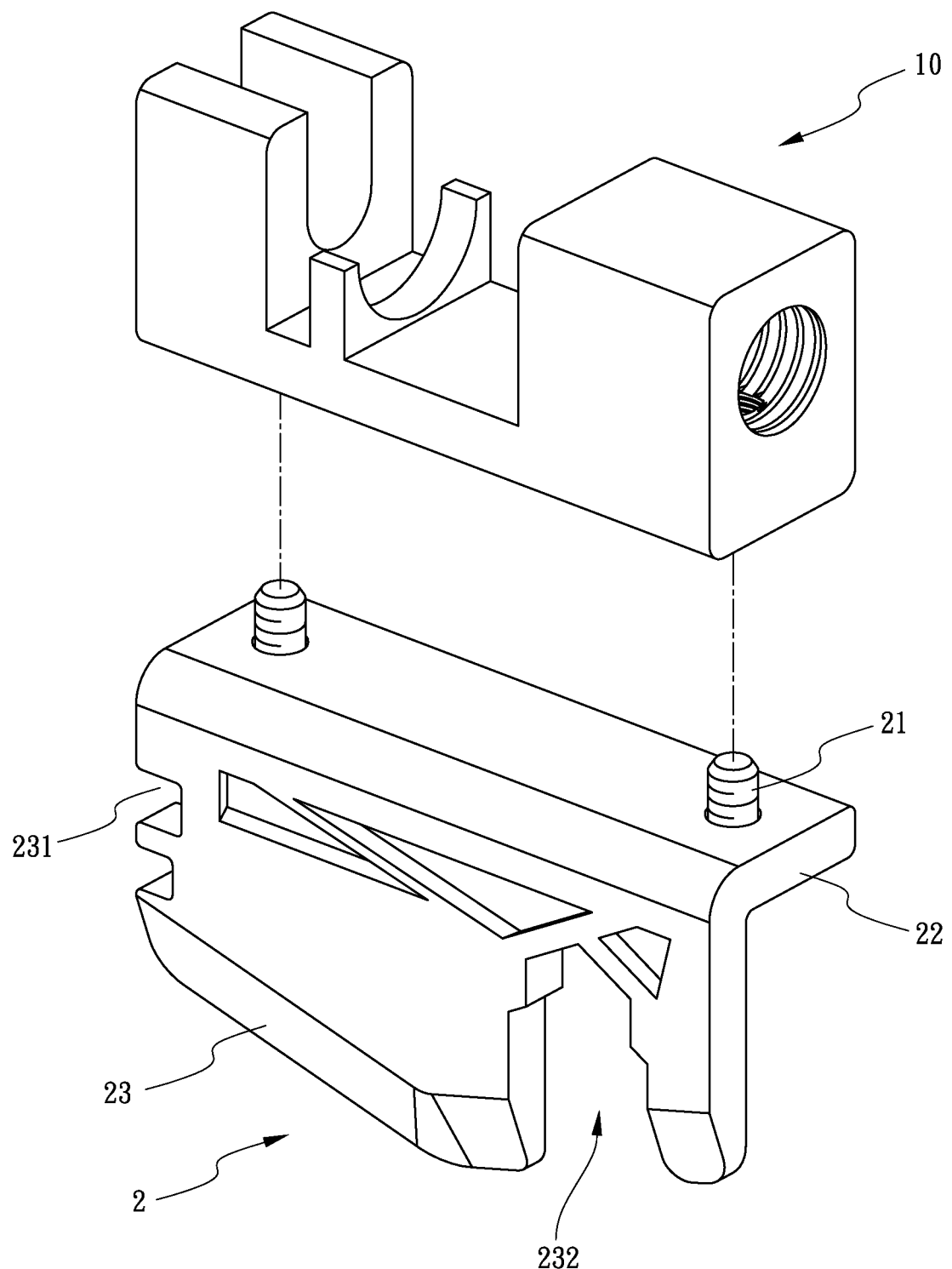
FIG. 3 is an exploded view of the present invention for showing a chain tool assembled to a sheet metal part.
Figure 4:
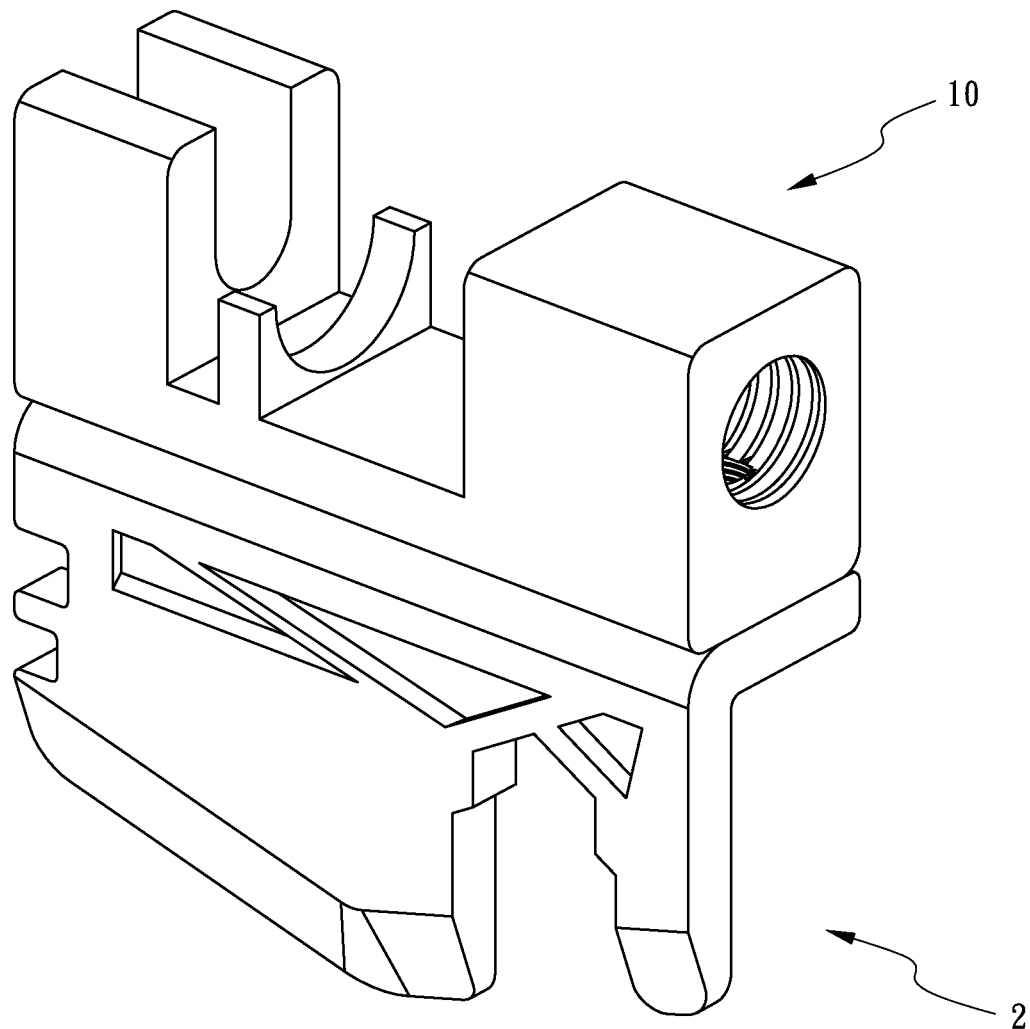
FIG. 4 is a perspective view of the present invention for showing the chain tool assembled with the sheet metal part.
Figure 5:
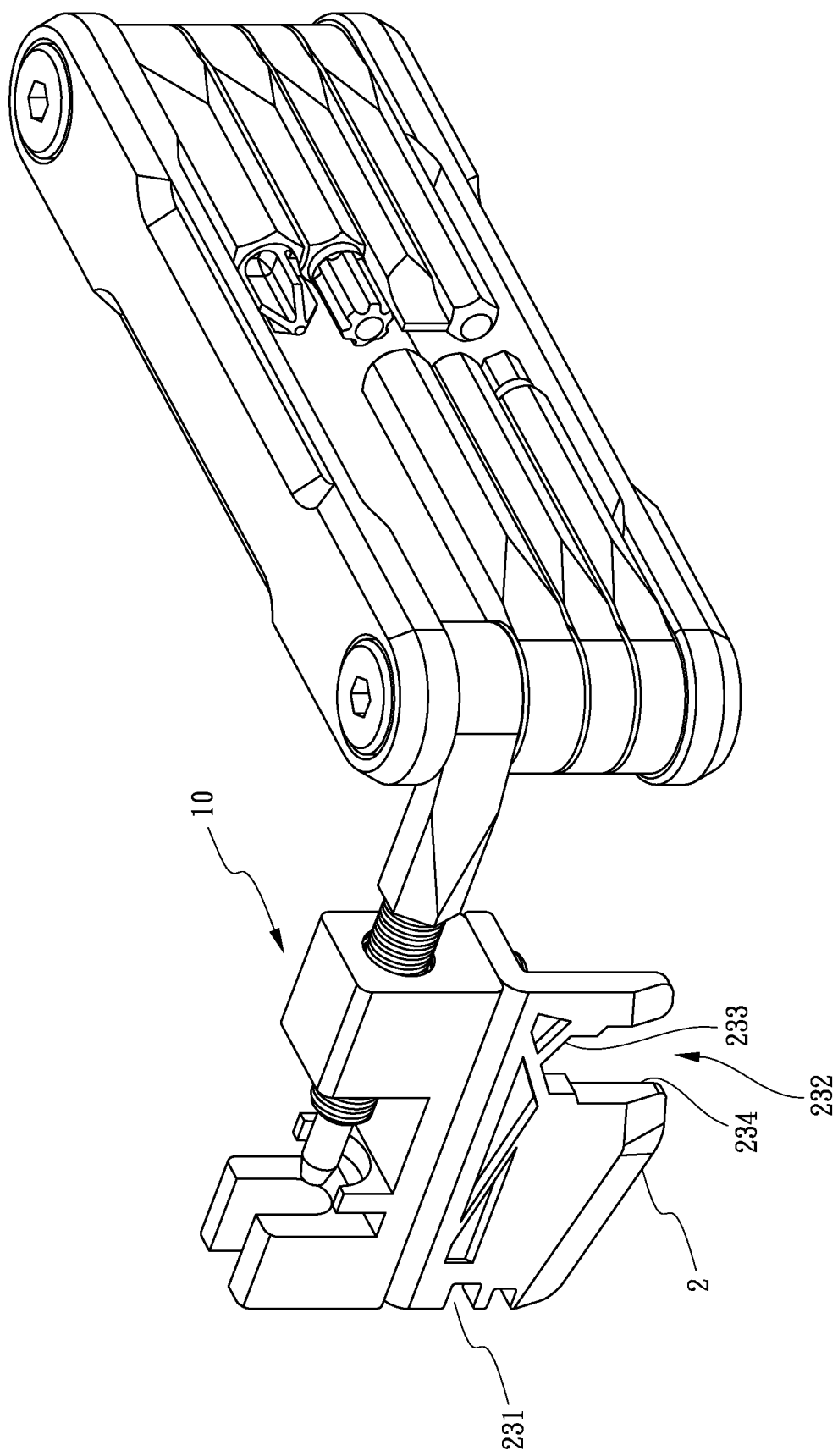
FIG. 5 is a perspective view of the present invention for showing a bicycle folding tool with the chain tool.
Figure 6:
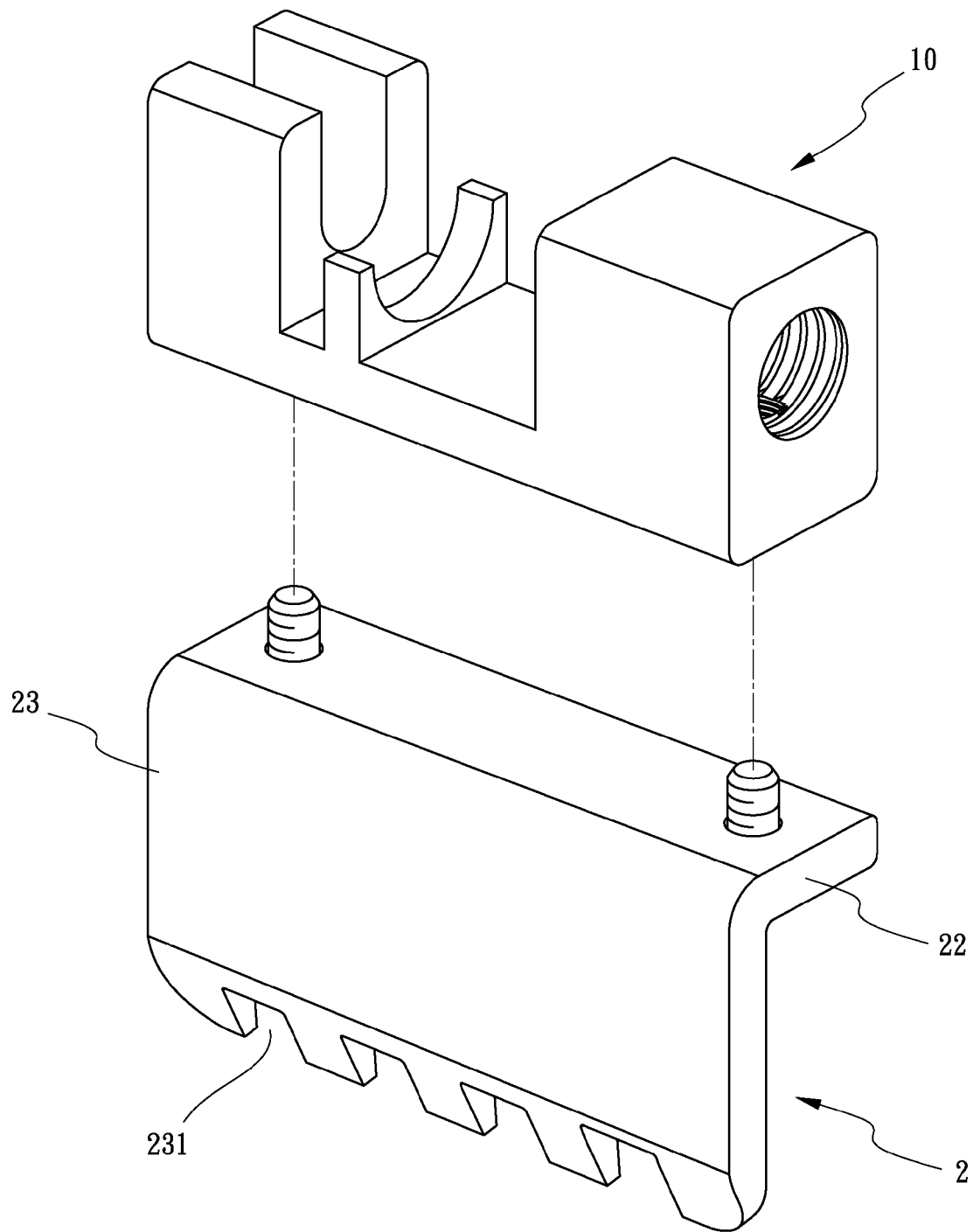
FIG. 6 is an exploded view of the present invention for showing the chain tool assembled to another sheet metal part.
Figure 7:
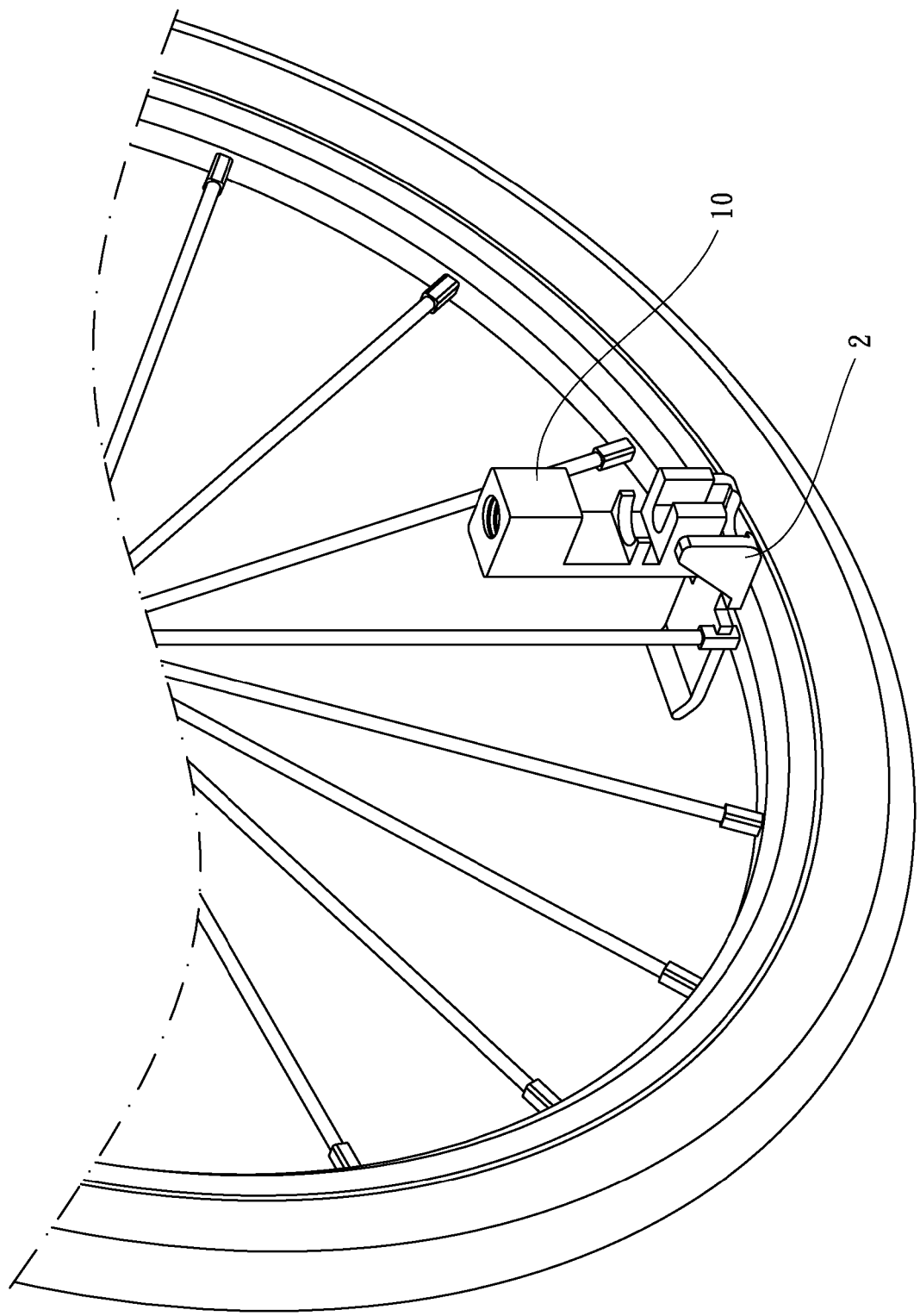
FIG. 7 is a schematic view for showing the chain tool with the other sheet metal part is applied to a bicycle wheel.

Referring to FIGS. 1-6, a manufacturing process for a chain tool of a bicycle folding tool in accordance with the present invention comprises following steps:

(a) Material preparing step: a rod 1 with a length is prepared.

(b) Manufacturing step: the manufacturing step comprises a milling cutting step and a drilling and tapping step. The rod 1 is milled via the milling cutting step to form a chain fixing groove 11, a detaching portion 12, an axial groove 13 and a screwing portion 14. The chain fixing groove 11 has a retaining wall 15 defined therein. The retaining wall 15 is milled to form an arc notch 151. The axial groove 13 is defined in one end of the rod 1 and communicates with the chain fixing groove 11. The screwing portion 14 is threaded to form a threaded hole 16 via the drilling and tapping step, wherein the axial groove 13, the arc notch 151 and the threaded hole 16 are defined coaxially.

(c) Heat treatment step: after the manufacturing process, the rod 1 is heat treated and forms a chain tool 10 (The heat treatment is used for improving the mechanical property of the rod 1).

(d) Sheet metal parts assembling step: choosing a sheet metal part 2 which is manufactured, and then the sheet metal part 2 is assembled to the chain tool 10 by a plurality of connecting parts 21 so that the chain tool 10 is attachable to various sheet metal parts 2.

Under this arrangement, the chain tool 10 of the present invention is made by a simple procedure so as to reduce the processing time and the manpower cost, thus the manufacturing cost is reduced. Furthermore, the milling cutting step of the present invention accomplishes a better appearance of the chain tool 10 than the conventional casting process; besides, the milling cutting step increases the dimensional precision and improves the quality yield as compared to the conventional casting process.

In addition, the chain tool 10 and the sheet metal part 2 are manufactured separately, which means the chain tool 10 and the sheet metal part 2 could be produced in different places at the same time; as a result, the processing steps and the processing time are reduced and the production efficiency is promoted. Besides, the chain tool 10 is assembled with the sheet metal part 2 which could be exchanged to other sheet metal part 2 with other functions according to the requirements. Therefore, a manufacturer could produce integrated chain tools with different functions and various shapes (Wherein the sheet metal part 2 of present invention is made by punching method; in addition, the chain tool 10 and the sheet metal part 2 of present invention are produced separately for reducing the processing steps; however, the manufacturing method of the sheet metal part 2 is not limited by the present invention.)

A user exchanges different types and functions of the sheet metal parts 2 and assembles with the chain tool 10 according to the requirements. Therefore, by assembling different types of sheet metal parts 2 to the chain tool 10, various folding tools with different functions of chain tools 10 are developed soon so as to satisfy different customers and market requirements immediately.

Referring to FIGS. 3-6, the chain tool 10 is assembled with different types of the sheet metal parts 2 according to different purposes. A first type of a sheet metal part 2 has a first assembling portion 22 and a first working portion 23. The first assembling portion 22 of said sheet metal part 2 is assembled to a bottom of the chain tool 10 so that said sheet metal part 2 is disposed below the chain tool 10. The first working portion 23 has a plurality of first clamping grooves 231 defined on an outer periphery thereof. Wherein, the first assembling portion 22 and the first working portion 23 of said sheet metal part 2 are arranged angularly so as to support the chain tool 10. The first clamping grooves 231 are used for adjusting the tension of spokes. The sheet metal part 2 as show in FIG. 5 further has a receiving groove 232 defined at the first working portion 23 thereof. The receiving groove 232 has a first opening 233 and a second opening 234 which communicates with the first opening 233 so as to sleeve onto various screws for assembling or disassembling the screws.

Figure 8:
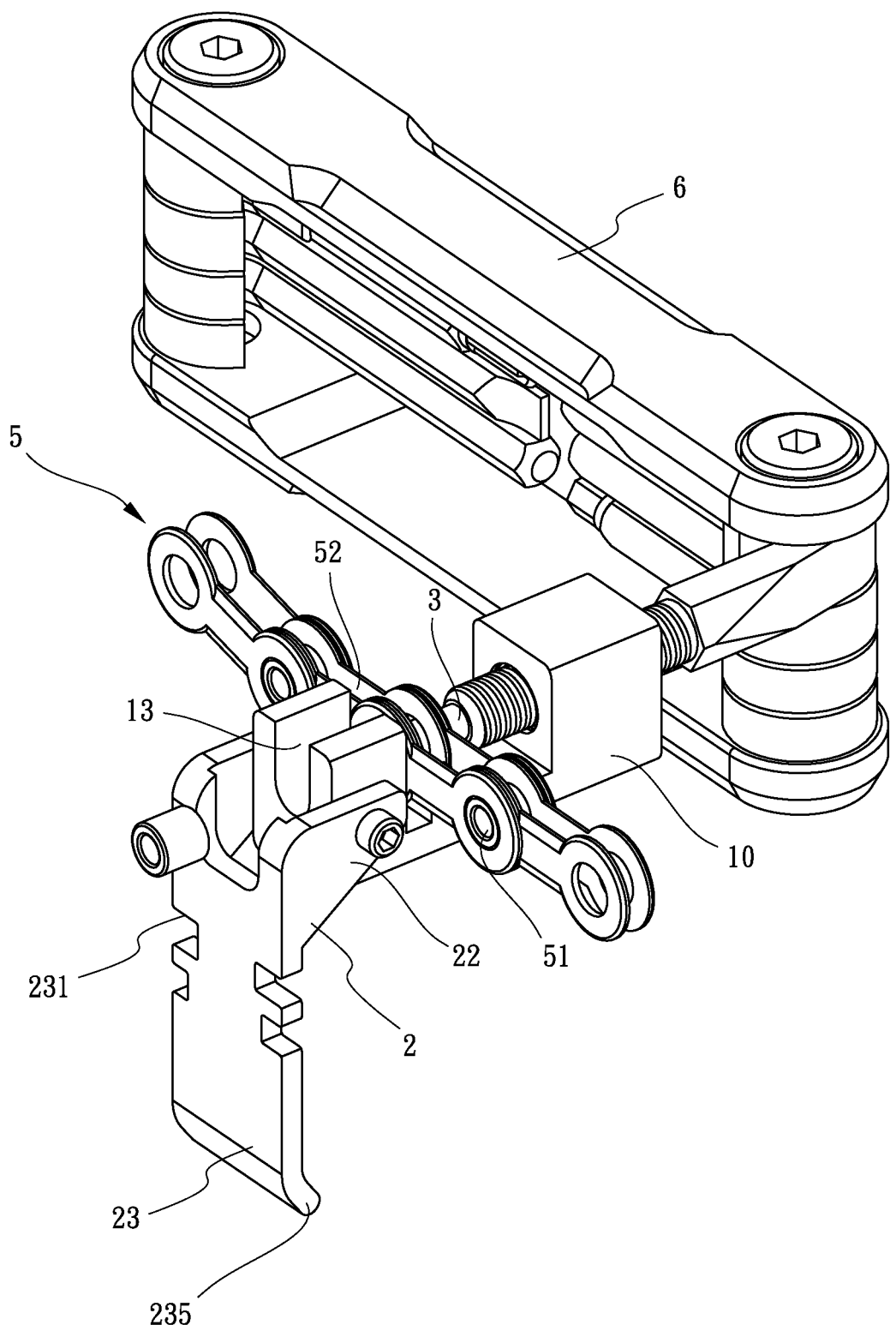
FIG. 8 is a schematic view for showing the chain tool with the other sheet metal part is applied to a chain.
Figure 9:
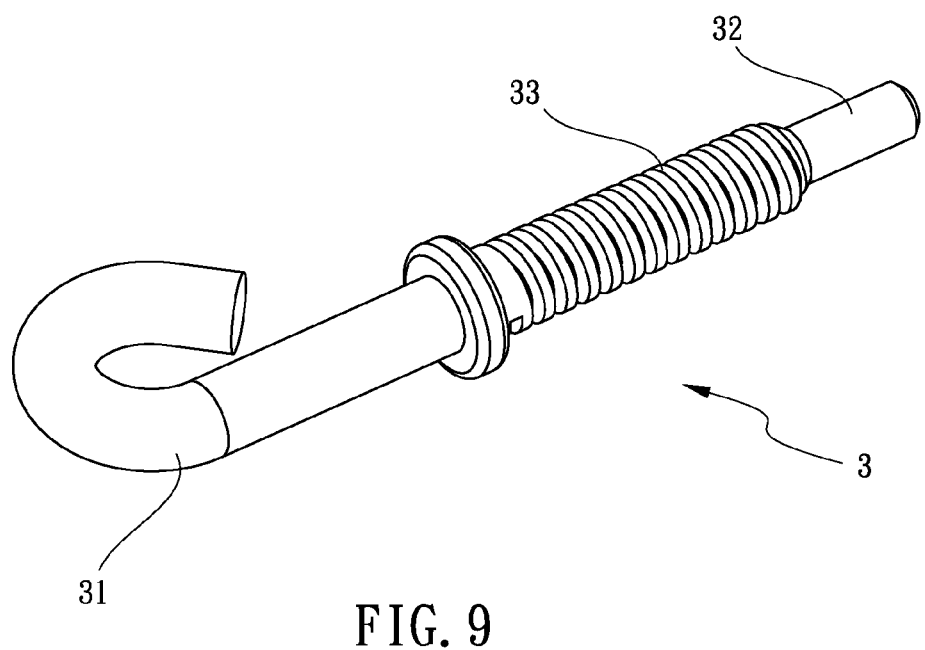
FIG. 9 is a perspective view of a first embodiment of a pressing rod.
Figure 10:
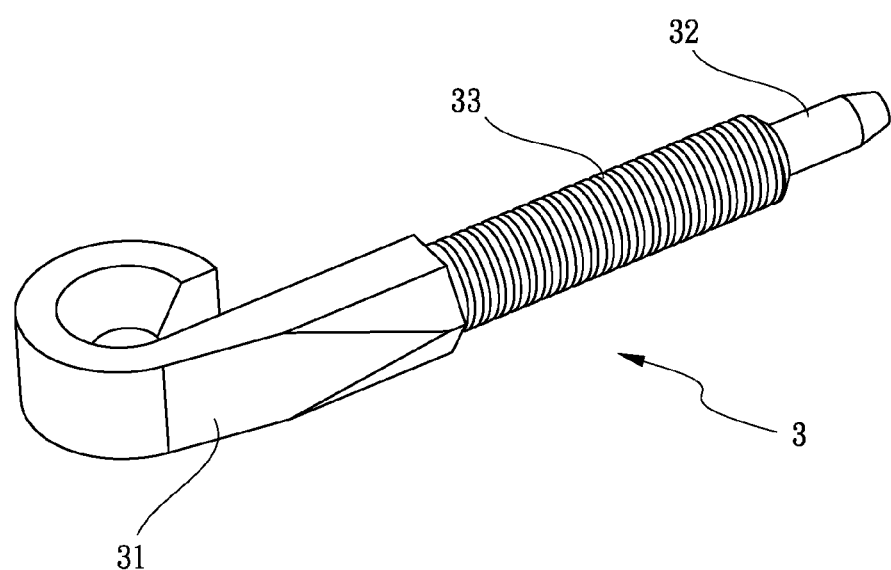
FIG. 10 is a perspective view of a second embodiment of the pressing rod.

FIG. 8 shows another type of a sheet metal part 2. The first assembling portion 22 of said sheet metal part 2 has two spaced ribs (not shown) so as to assembled to an outer periphery of the chain tool 10. The first working portion 23 has a first operating part 235 defined at one end thereof and a plurality of first clamping grooves 231 defined at an outer periphery thereof. The first operating part 235 is used for assembling or disassembling a wheel.

Referring to FIGS. 2, 9, 10, 11, the other type of a sheet metal part 2 comprises a pressing rod 3 and a controlling member 4. The pressing rod 3 has a bending end 31, an operating end 32 and a threaded section 33 which is defined between the bending end 31 and the operating end 32. The controlling member 4 has a second assembling portion 41 and a second working portion 42. The second assembling portion 41 of the controlling member 4 is assembled to the bending end 31 of the pressing rod 3. The second working portion 42 has a plurality of second clamping grooves 421 and a second operating part 422. The operating end 32 of the pressing rod 3 is inserted into the threaded hole 16 firstly; and then, the threaded section 33 is screwed into the threaded hole 16. The controlling member 4 is located outside the chain tool 10, so that the user rotates the pressing rod 3 conveniently, such that the threaded section 33 of the pressing rod 3 is rotated relative to the threaded hole 16.

Referring to FIGS. 2-11, a chain 5 has a plurality of joints 51. A plurality of slots 52 is defined at two sides of each joint 51. When the user wants to replace or clean the chain 5 of a bicycle, the chain 5 is placed on the chain fixing groove 11 longitudinally firstly; and then, the two ribs of the retaining wall 15 are passed through the slots 52, so that one joint 51 of the chain 5 is positioned on the arc notch 151; finally, the threaded section 33 of the pressing rod 3 is screwed into the threaded hole 16. One detaching means for the chain 5 is described as following. Firstly, the chain tool 10 is supported by the sheet metal part 2; and then, the pressing rod 3 which is pivotally connected to a folding tool 6 is screwed into the threaded hole 16; thereby, the user rotates the folding tool 6 to drive the pressing rod 3 into the threaded hole 16 and to push one joint 51 by the operating end 32 of the pressing rod 3; while the operating end 32 pushes one joint 51, the chain 5 is abutted against an inner wall of the chain fixing groove 11 near the axial groove 13 and one joint 51 corresponds to the axial groove 13. Therefore, one joint 51 is detached from the chain 5 after the push of the operating end 32, so that the chain 5 is opened.

Figure 11:
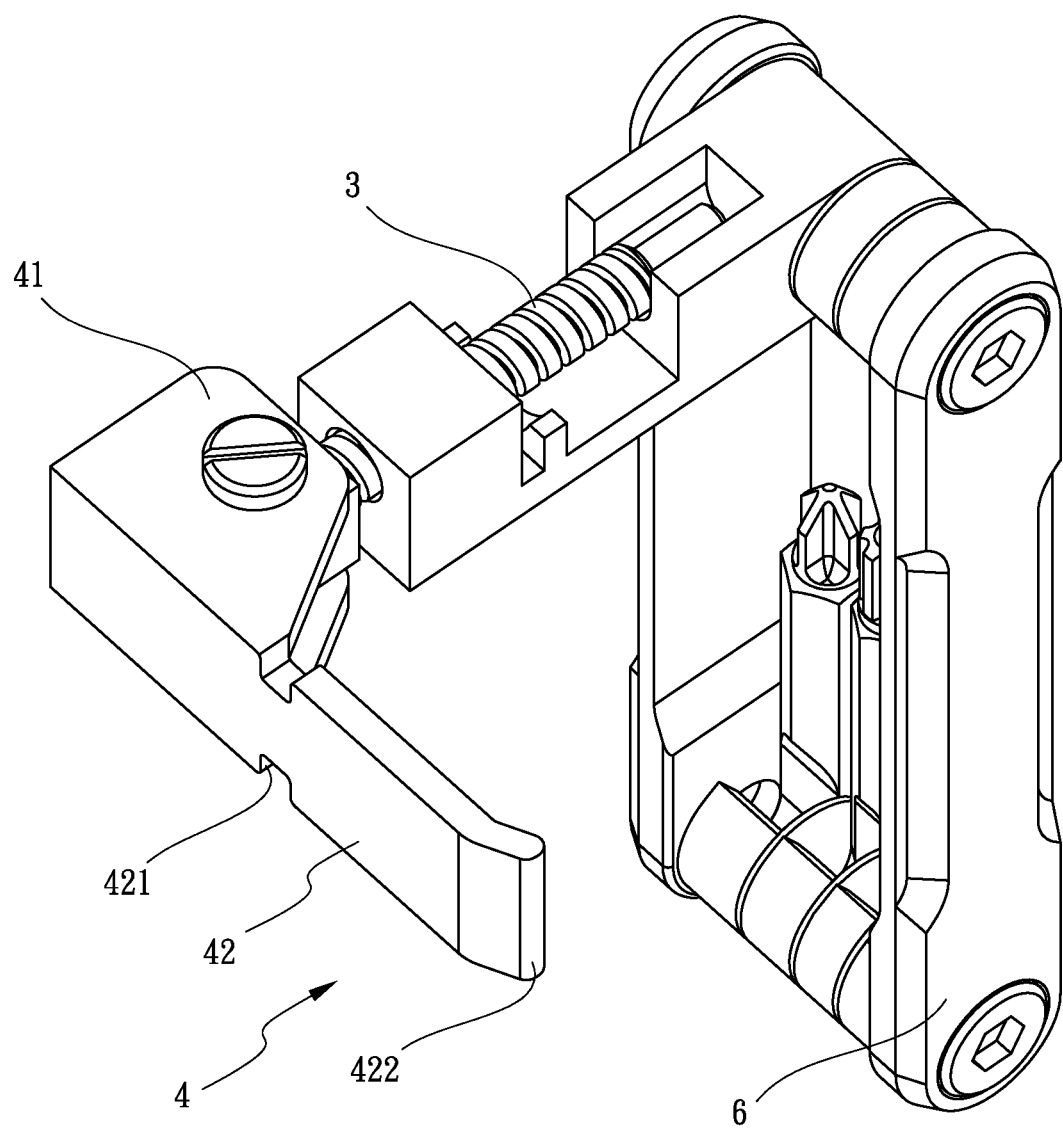
FIG. 11 is a perspective view of the present invention for showing a controlling member assembled to the chain tool.

FIG. 11 shows another detaching means for the chain 5. The chain tool 10 is pivotally connected to the folding tool 6. Firstly, the chain tool is pivotally rotated to an operating position relative to the folding tool, so that the threaded hole 16 is positioned outwardly; and then, the pressing rod 3 which is assembled with the controlling member 4 is inserted into the threaded hole 16; therefore, the user rotates the controlling member 4 to drive the pressing rod 3 into the threaded hole 16 so as to detach the chain 5. The controlling member 4 is convenient for the user to operate the pressing rod 3 in any direction. The bending end 31 of the pressing rod 3 is cylindrical bending-shaped or bending-shaped with a rectangular cross-section.

Furthermore, the milling cutting step and the drilling and tapping step of the manufacturing step could be interchanged.

In addition, the rod 1 is square-shaped or circle-shaped or hexagonal-shaped.

The connecting parts 21 are screws or rivets. The screws are convenient for the user to assemble the sheet metal part 2 on the chain tool 10, and the rivets increase the connecting strength between the sheet metal part 2 and the chain tool 10.

Although the invention has been explained in relation to its preferred embodiment, it is to be understood that many other possible modifications and variations can be made without departing from the spirit and scope of the invention as hereinafter claimed.

What is claimed is:

1. A manufacturing process for a chain tool in combination with a sheet metal part, comprising following steps:
    (a) material preparing step: a rod with a length being prepared;
    (b) manufacturing step: the manufacturing step comprising a milling cutting step and a drilling and tapping step, the rod being milled via the milling cutting step to form a chain fixing groove, a detaching portion, an axial groove and a screwing portion, the chain fixing groove having a retaining wall defined therein, the retaining wall being milled to form an arc notch, the axial groove being defined in one end of the rod and communicating with the chain fixing groove, the screwing portion being threaded to form a threaded hole via the drilling and tapping step, wherein the axial groove, the arc notch and the threaded hole are defined coaxially;
    (c) heat treatment step: after the manufacturing step, the rod being heat treated and forming a chain tool; and
    (d) sheet metal parts assembling step: choosing a sheet metal part, a pressing rod and a controlling member; and then the sheet metal part, the pressing rod and the controlling member being assembled to the chain tool, the pressing rod having a bending end, an operating end and a threaded section which is defined between the bending end and the operating end; the controlling member having a second assembling portion, a plurality of second clamping grooves and a second operating part; the second assembling portion of the controlling member being assembled to the bending end of the pressing rod; the operating end of the pressing rod being inserted into the threaded hole firstly; and then, the threaded section being screwed into the threaded hole; the controlling member being located outside the chain tool, so that a user rotates the pressing rod conveniently, such that the threaded section of the pressing rod is rotated relative to the threaded hole.

2. The manufacturing process for a chain tool in combination with a sheet metal part as claimed in claim 1, wherein the milling cutting step and the drilling and tapping step are operated in order under the manufacturing step.

3. The manufacturing process for a chain tool in combination with a sheet metal part as claimed in claim 1, wherein the drilling and tapping step and the milling cutting step are operated in order under the manufacturing step.

4. The manufacturing process for a chain tool in combination with a sheet metal part as claimed in claim 1, wherein the sheet metal parts assembling step provides that the bending end of the pressing rod is cylindrical bending-shaped or bending-shaped with a rectangular cross-section.

* * * * *